United States Patent
Yoshizawa et al.

(10) Patent No.: US 7,552,287 B2
(45) Date of Patent: Jun. 23, 2009

(54) METHOD AND SYSTEM OF CONTROLLING A CACHE MEMORY BY INTERRUPTING PREFETCH REQUEST WITH A DEMAND FETCH REQUEST

(75) Inventors: Shuichi Yoshizawa, Kawasaki (JP); Hiroyuki Kojima, Kawasaki (JP); Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 267 days.

(21) Appl. No.: 10/986,860

(22) Filed: Nov. 15, 2004

(65) Prior Publication Data

US 2006/0026366 A1 Feb. 2, 2006

(30) Foreign Application Priority Data

Jul. 29, 2004 (JP) ............................ 2004-221156

(51) Int. Cl.
*G06F 12/00* (2006.01)

(52) U.S. Cl. ........................ 711/137; 711/118; 711/122; 711/140

(58) Field of Classification Search ........................ None
See application file for complete search history.

(56) References Cited

U.S. PATENT DOCUMENTS 6,625,697 B1 9/2003 Stoess et al.
6,643,745 B1 11/2003 Palanca et al.

FOREIGN PATENT DOCUMENTS

JP 2-133842 5/1990

OTHER PUBLICATIONS

European Office Action dated Aug. 11, 2006.
European Communication dated Aug. 1, 2008 in corresponding European Application No. 08152649.3-1229/1942416.

*Primary Examiner*—Hyung S Sough
*Assistant Examiner*—Kaushikkumar Patel
(74) *Attorney, Agent, or Firm*—Staas & Halsey LLP (57) ABSTRACT

A cache memory control unit that controls a cache memory comprises: a PF-PORT 22 and MI-PORT 21 that receive a prefetch request and demand fetch request issued from a primary cache; and a processing pipeline 27 that performs swap processing when the MI-PORT 21 receives a demand fetch request designating the same memory address as that designated by a prefetch request that has already been received by the PF-PORT 22, the swap processing being performed so that an MIB 28 that has been ensured for replying the prefetch request is used for a reply to the demand fetch request following the prefetch request.

22 Claims, 8 Drawing Sheets

| Prefetch request | Demand fetch request | P-Req | S-Reply | L2 TC | I1 TC | D1 TC |
|---|---|---|---|---|---|---|
| IF-PF-SH | IF-MI-SH | P-RDSA | S-RBS | S | V | - |
| IF-PF-SH | OP-MI-SH | P-RDSA | S-RBS | S | - | C |
| OP-PF-SH | IF-MI-SH | P-RDS | S-RBS/S-RBU | S/E | V | - |
| OP-PF-SH | OP-MI-SH | P-RDS | S-RBS/S-RBU | S/E | - | C |
| OP-PF-EX | IF-MI-SH | P-RDO | S-RBU | M | V | - |
| OP-PF-EX | OP-MI-SH | P-RDO | S-RBU | M | - | M |
| OP-PF-EX | OP-MI-CH | P-RDO | S-RBU | M | - | M |
| IF-PF-SH | OP-MI-BL | P-RDSA | S-RBS | S | - | - |
| OP-PF-SH | OP-MI-BL | P-RDS | S-RBS/S-RBU | S/E | - | - |
| OP-PF-EX | OP-MI-BL | P-RDO | S-RBU | E | - | - |

PRIOR ART

FIG. 7

| L2 cache request | P-Req | S-Reply | L2 TC | I1 TC | D1 TC |
|---|---|---|---|---|---|
| IF-MI-SH | P-RDSA | S-RBS | S | V | - |
| OP-MI-SH | P-RDS | S-RBS/S-RBU | S/E | - | C |
| OP-MI-CH | P-RDO | S-RBU | M | - | M |
| IF-PF-SH | P-RDSA | S-RBS | S | - | - |
| OP-PF-SH | P-RDS | S-RBS/S-RBU | S/E | - | - |
| OP-PF-EX | P-RDO | S-RBU | E | - | - |
| OP-MI-BL | P-RDD | S-RBS | - | - | - |

METHOD AND SYSTEM OF CONTROLLING A CACHE MEMORY BY INTERRUPTING PREFETCH REQUEST WITH A DEMAND FETCH REQUEST

BACKGROUND OF THE INVENTION

1. Field of the Invention

The present invention relates to a cache memory control unit having a primary cache and a secondary cache, a cache memory control method, a central processing unit, an information processor, and a central processing method.

2. Description of the Related Art

Figure 6:
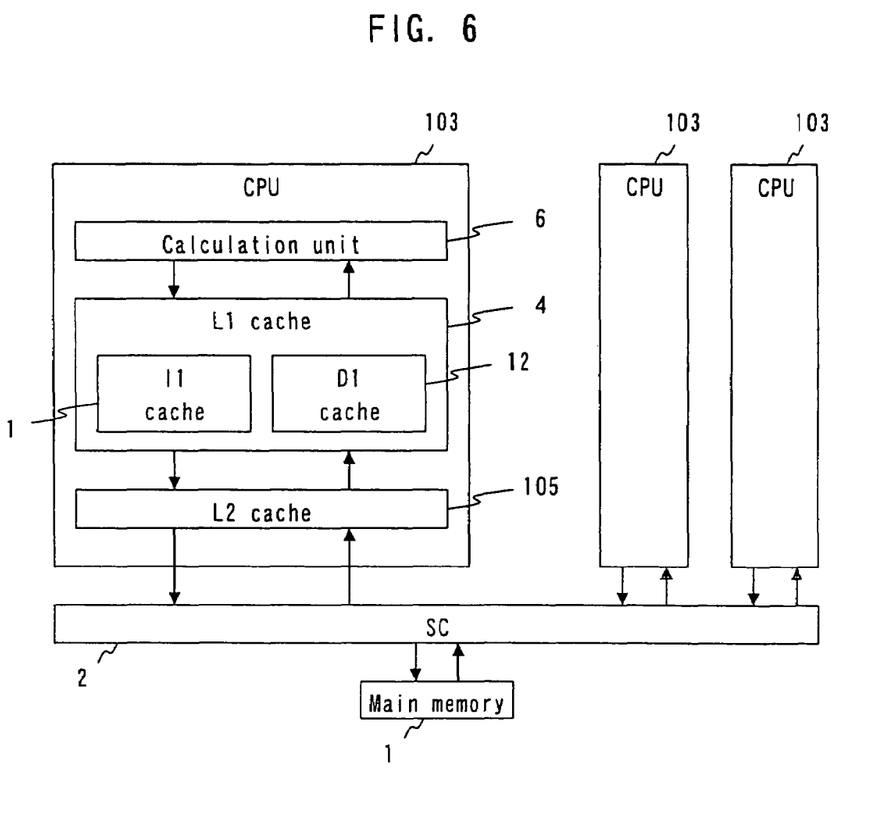
FIG. 6 is a block diagram showing a configuration example of a conventional multiprocessor system.

FIG. 6 is a block diagram showing a configuration example of a conventional multiprocessor system. The conventional multiprocessor system includes a main memory 1, an SC (System Controller) 2, and one or more CPUs (Central Processing Unit) 103. The SC 2 is a main memory controller connected to the main memory 1 and all CPUs 103. The CPU 103 internally includes an L1 cache 4, an L2 cache 105, and a calculation unit 6. The L1 cache 4 is a primary cache of the CPU 103, and the L2 cache 105 is a secondary cache thereof. The L1 cache 4 includes an I1 cache 11 as an instruction cache and a D1 cache 12 as a data (operand) cache. The calculation unit 6 performs calculation using data of L1 cache 4.

As a method for hiding latency in CPU memory access, a prefetch operation has been widely used. With this method, the area in a main memory that is likely to be used is previously "moved-in" (data of the main memory is previously registered in a cache), thereby reducing cache miss rate.

An L2 cache request (request to the L2 cache 105 issued from the L1 cache 4) includes a demand fetch request which is a normal readout operation from the main memory 1 and a prefetch request which is a speculative readout operation. The demand fetch request performs registration of data both in the L2 cache 105 and the L1 cache 4 which is a request source. On the other hand, the prefetch request performs data registration only in the L2 cache 105.

Figure 7:
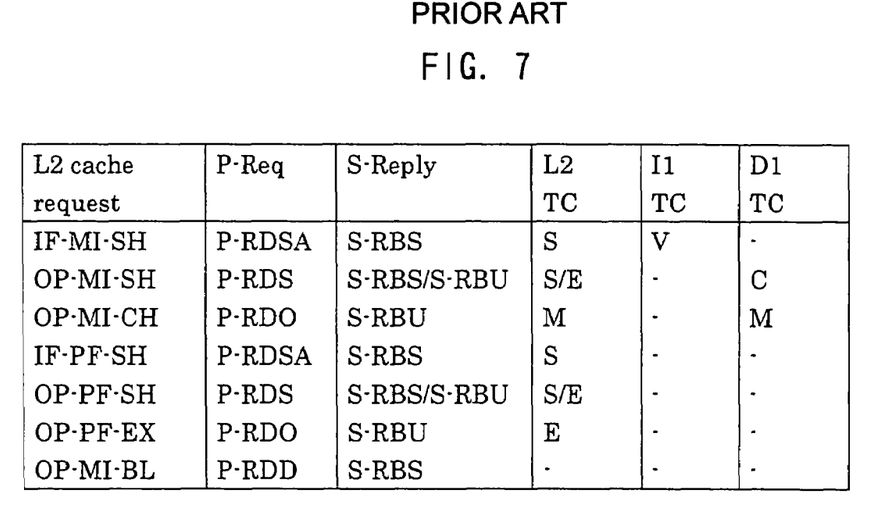
FIG. 7 is a table showing an example of L2 cache requests.

Next, a description will be given of the types of the L2 cache requests. FIG. 7 is a table showing an example of L2 cache requests. Here, a cache block of the I1 cache 11 is managed by I1 TC (Type Cord) that assumes two states: V (Valid) and I (Invalid). A cache block of the D1 cache 12 is managed by D1 TC (Type Cord) that assumes three states: M (Modified), C (Clean), and I (Invalid). A cache block of the L2 cache 105 is managed by L2 TC (Type Cord) that assumes five states: M (Modified), O (Ownered), E (Exclusive), S (Shared), and I (Invalid).

Firstly, L2 cache requests for the demand fetch request: IF-MI-SH, OP-MI-SH, and OP-MI-CH will be explained.

The L1 cache 11 issues IF-MI-SH (L2 cache request for requesting a shared cache block) when an instruction fetch miss has occurred.

The D1 cache 12 issues OP-MI-SH (L2 cache request for requesting a shared cache block) when an operand load miss has occurred. Further, the D1 cache 12 issues OP-MI-SH (L2 cache request for requesting a shared cache block) when an operand store miss has occurred. Further, the D1 cache 12 issues OP-MI-BL (L2 cache request called a block load that does not involve cache registration) for an operand load.

In order to increase L2 cache hit rate at the time of L1 cache miss, L2 cache requests for the prefetch request: IF-PF-SH, OP-PF-SH, and OP-PF-EX are prepared in correspondence with the aforementioned L2 cache requests for the demand fetch request: IF-MI-SH, OP-MI-SH, and OP-MI-CH, respectively.

The L1 cache 4 does not involve at all the prefetch request that the L1 cache 4 itself has issued. The L2 cache 105 can discard a prefetch request when it is difficult to perform prefetch processing, for example, in the case where there are many requests that have not been processed.

An operation between the L2 cache 105 and SC 2 will next be described. The L2 cache 105 sends reply data to the L1 cache 4 when the L2 cache request is a cache hit. On the other hand, the L2 cache data 105 issues a move-in request P-Req to the SC 2 when the L2 cache request is a cache miss, and receives data S-Reply as a reply of the P-Req. The data S-Reply is then sent to the L1 cache 4 and is registered also in the L2 cache 105 at the same time.

When P-Req from the L2 cache 105 to the SC 2 is P-RDSA (robust shared type), S-RBS (shared type) is returned as S-Reply from the SC 2 to the L2 cache 105. When P-Req is P-RDS (shared type), S-RBS (shared type) or S-RBU (exclusive type) is returned as S-Reply. When P-Req is P-RDO (exclusive type), S-RBU is returned as S-Reply.

When L2 cache request is OP-MI-CH, registration is performed in M (modified) state even when a reply cache block is a clean one (write back to the memory is not necessary).

When L2 cache request OP-MI-BL results in L2 cache miss, P-RDD (discard type request that does not involve invalidation of other cache blocks or data-sharing) is issued from the L2 cache 105 to the SC 2.

Figure 8:
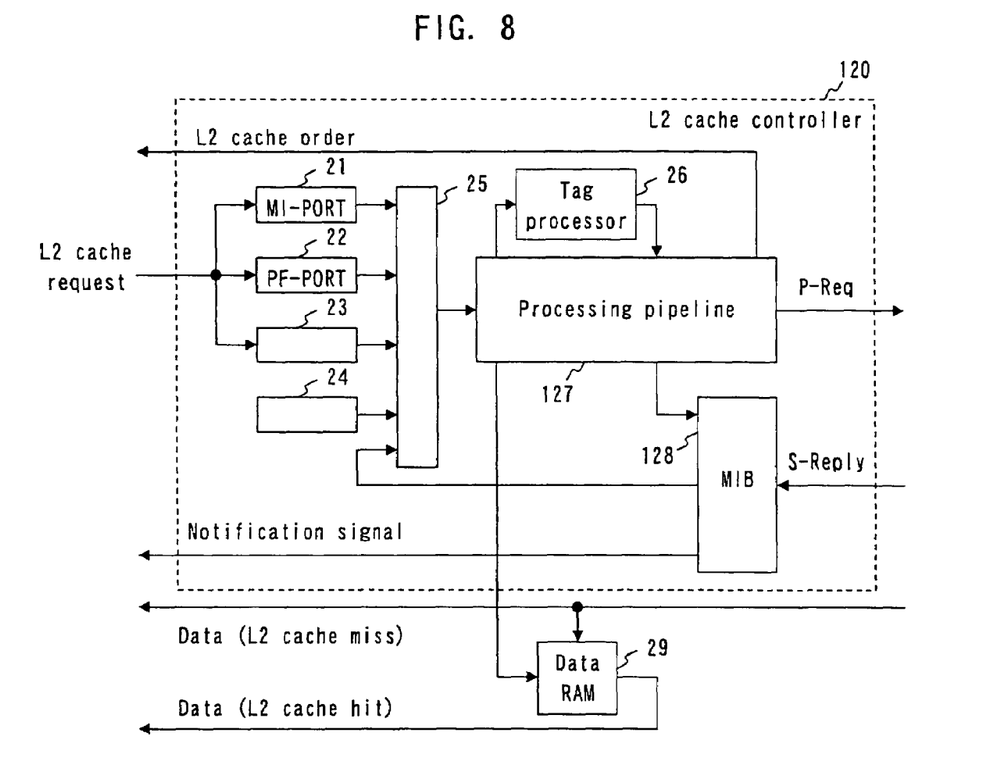
FIG. 8 is a block diagram showing a configuration example of the conventional L2 cache.

A configuration of the L2 cache 105 will next be described. FIG. 8 is a block diagram showing a configuration example of the conventional L2 cache. The L2 cache 105 is constituted by an L2 cache controller 120 and a data RAM 29. The L2 cache controller 120 includes an MI-PORT 21, a PF-PORT 22, other ports 23, 24, a priority section 25, a tag processor 26, a processing pipeline 127, and an MIB (Move-in Buffer) 128.

L2 cache request to the L2 cache 105 is firstly received by ports 21, 22, 23, and 24 that are associated with the L2 cache requests. The priority section 25 fetches the L2 cache requests remaining in the ports 21, 22, 23, and 24 and feeds the fetched requests into the processing pipeline 127. The processing pipeline 127 performs tag-search and tag-update operations in the tag processor 26, issues a reply to the L1 cache in response to the L2 cache request, ensures the MIB 128, and the like. The MIB 128 is a buffer for receiving cache miss data from the SC 2 and is ensured for each move-in processing.

The MIB 128 is ensured at the cache miss time, then holds tag information, and is released upon completion of the corresponding move-in processing. The tag information includes a move-in request source, a move-in request address, a write back address to be replaced, and the like. The MIB 128 has a section that notifies the L1 cache 4 of move-in data arrival from the SC 2 and an abnormal end of the process for the move-in request address. Examples of a notification signal to the L1 cache 4 include a data valid signal, an error notification signal, and the like. The data RAM 29 stores data from the SC 2. The data from the SC 2, which has been obtained due to an L2 cache hit, is sent to the L1 cache 4. The data from the SC 2, which has been obtained due to an L2 cache miss is sent to the L1 cache 4 and at the same time, registered in the data RAM 29.

Figure 9:
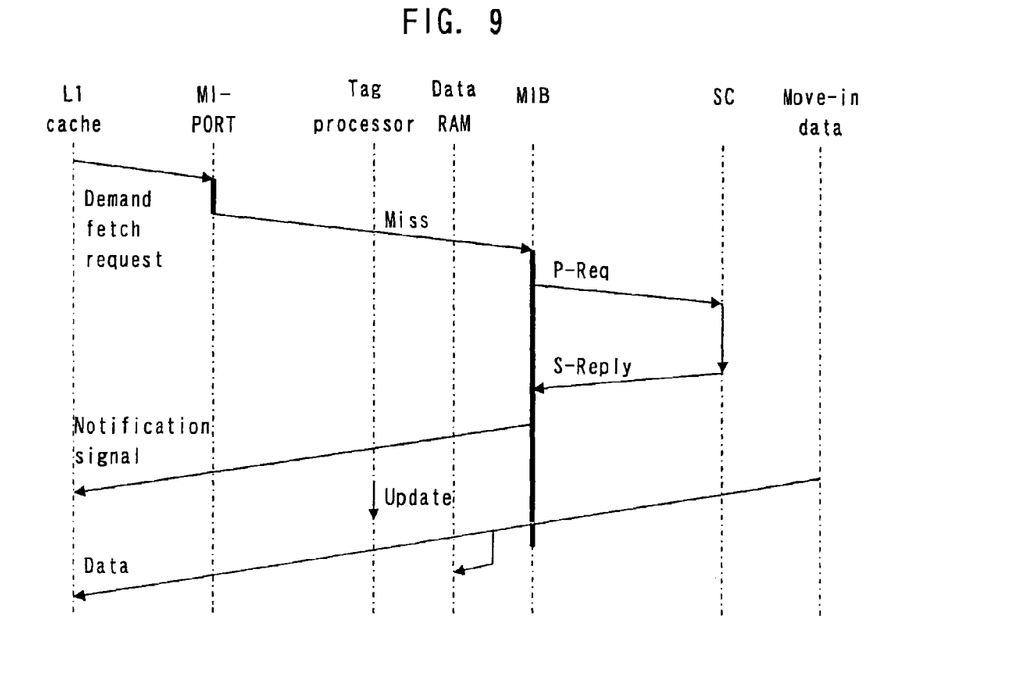
FIG. 9 is a time chart showing an example of an operation of the L2 cache for a normal demand fetch request.

A normal demand fetch operation will next be described. FIG. 9 is a time chart showing an example of an operation of the L2 cache for a normal demand fetch request. The demand fetch request issued from the L1 cache 4 is stored in the MI-PORT 21, fetched in the priority section 25 and fed to the processing pipeline 127. Since the result obtained by performing a tag search with a read flow is cache miss in the case of FIG. 9, the MIB 128 is ensured and a move-in request is issued to the SC 2. Move-in data from the SC 2 is immediately sent to the L1 cache 4 and at the same time is registered in the L2 cache 105 as a rule.

Figure 10:
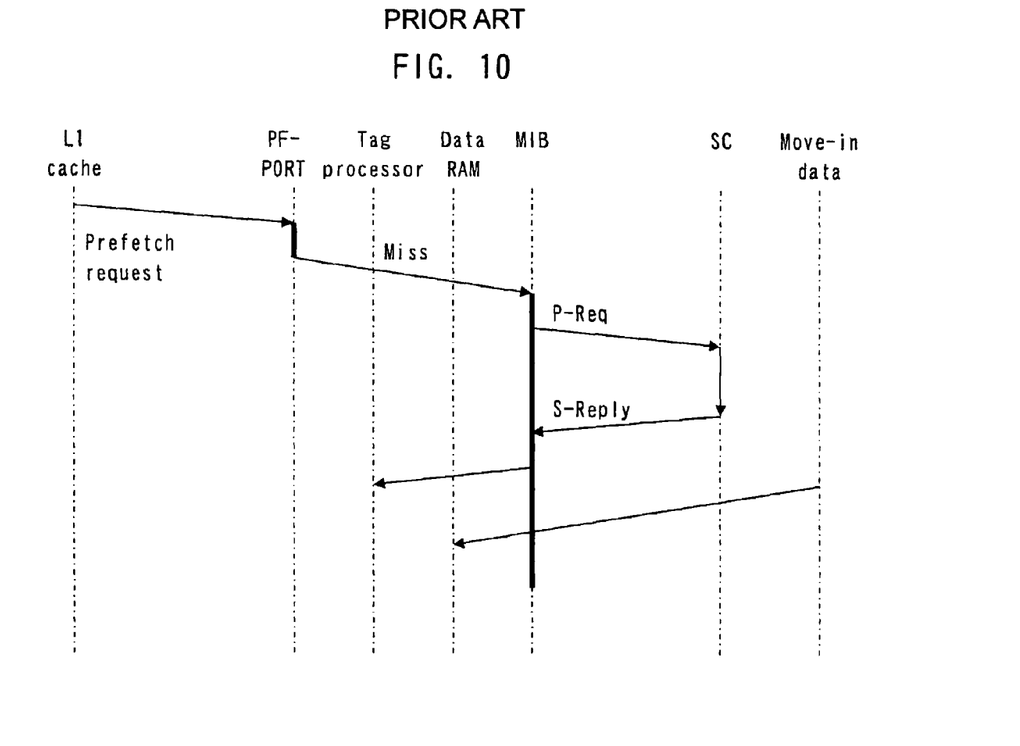
FIG. 10 is a time chart showing an example of an operation of the L2 cache for a normal prefetch request.

A normal prefetch operation will next be described. FIG. 10 is a time chart showing an example of an operation of the L2 cache for a normal prefetch request. The prefetch request issued from the L1 cache 4 is stored in the PF-PORT 22, fetched in the priority section 25 and fed to the processing pipeline 127. Since the result of a tag search is cache miss in the case of FIG. 10, the MIB 128 is ensured and a move-in request is issued to the SC 2. Move-in data from the SC 2 is registered only in the L2 cache 105, and the operation ends.

As a reference of the related art, Japanese Patent Application Laid-Open No. 2-133842 (pages 4 to 6, FIG. 2) is known.

In the aforementioned conventional L2 cache, when an MIB being in a move-in stand-by state and having the same memory address as that of a request that has been fed to the processing pipeline 127 exists, processing of the request in the processing pipeline 127 is disrupted and the request is allowed to remain in the port so that a move-in request for the same address is not issued during the time between an issuance of the move-in request to the SC 2 and arrival of a reply from the SC 2.

Figure 11:
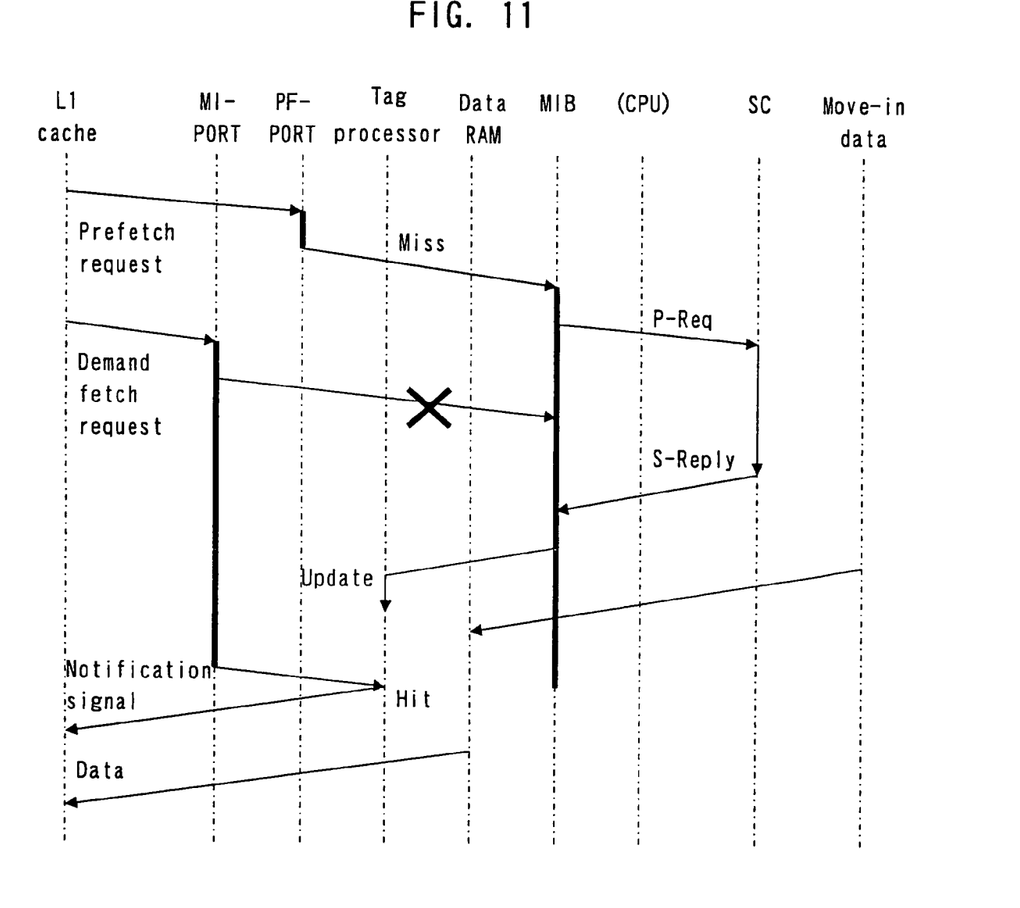
FIG. 11 is a time chart showing an example of an operation of the conventional L2 cache in the case where a demand fetch request is issued immediately after issuance of a prefetch request.

FIG. 11 is a time chart showing an example of an operation of the conventional L2 cache in the case where a demand fetch request is issued immediately after issuance of a prefetch request. The prefetch and demand fetch requests are made for an address on the same cache block. The preceding prefetch request is fetched from the PF-PORT 22 and fed to the processing pipeline 127. Since the result of a tag search is cache miss in the case of FIG. 11, the MIB is ensured and a request is issued to the SC 2. The succeeding demand fetch request is fetched from the MI-PORT 21. In this case, the request address is in a waiting state and processing does not proceed, with the result that the demand fetch request remains in the MI-PORT 21. After that, a move-in data as a reply to the preceding prefetch request arrives, a cache block is registered in a tag, and the MIB 128 is released. After completion of the processing of the preceding prefetch request, a cache hit of the succeeding demand fetch request starts processing of the demand fetch.

That is, although the demand fetch request has been issued from the L1 cache 4 and the move-in data has arrived from the SC 2, data cannot be directly passed to the L1 cache 4 since the move-in data is a reply to the prefetch request, with the result that the data is registered only in the L2 cache 105. When the demand fetch request is fed to the processing pipeline after completion of the move-in to the prefetch request, the data that has been registered in the L2 cache 105 is sent to the L1 cache 4. Therefore, waiting time for the prefetch processing to be completed is generated in the demand fetch processing.

SUMMARY OF THE INVENTION

The present invention has been made to solve the above problem, and an object thereof is to provide a cache memory control unit that reduces waiting time in a demand fetch processing for a prefetch processing to be completed, a cache memory control method, a central processing unit, an information processor, and a central processing method.

To solve the above problem, according to a first aspect of the present invention, there is provided a cache memory control unit that controls a cache memory comprising: a request receiving section that receives a prefetch request and demand fetch request issued from a primary cache; and a swap processing section that performs swap processing when the request receiving section receives a demand fetch request designating the same memory address as that designated by a prefetch request that has already been received by the request receiving section, the swap processing being performed so that a move-in buffer that has been ensured for replying the prefetch request is used for a reply to the demand fetch request following the prefetch request.

In the cache memory control unit according to the present invention, the swap processing section performs the swap processing by rewriting tag information of the move-in buffer.

In the cache memory control unit according to the present invention, when a correct reply to the prefetch request has arrived during a swap determination period at which it is determined whether the swap processing is performed or not, the swap processing section issues, to the primary cache, a prior notice indicating the arrival of a reply to the demand fetch request.

In the cache memory control unit according to the present invention, the swap processing section issues, to the primary cache, a cancel of the prior notice when it has been determined, after the issuance of the prior notice during the swap determination period, that swap processing is not performed.

In the cache memory control unit according to the present invention, the swap processing section performs the swap processing even when an error reply to the prefetch request has arrived during the swap determination period at which it is determined whether the swap processing is performed or not.

In the cache memory control unit according to the present invention, when the error reply is delayed by the swap processing and thereby the error reply and a succeeding reply collide with each other, the swap processing section delays issuance of the succeeding reply.

In the cache memory control unit according to the present invention, the swap processing section performs the swap processing even when the demand fetch request is a request that need not to be registered in a secondary cache.

According to a second aspect of the present invention, there is provided a memory control method for controlling a cache memory comprising: a request receiving step of receiving a prefetch request and demanding fetch request issued from a primary cache; and a swap processing step of performing swap processing when the request receiving step receives a demand fetch request designating the same memory address as that designated by a prefetch request that has already been received in the request receiving step, the swap processing being performed so that a move-in buffer that has been ensured for replying the prefetch request is used for a reply to the demand fetch request following the prefetch request.

In the cache memory control method according to the present invention, the swap processing step performs the swap processing by rewriting tag information of the move-in buffer.

In the cache memory control method according to the present invention, when a correct reply to the prefetch request has arrived during a swap determination period at which it is determined whether the swap processing is performed or not, the swap processing step issues, to the primary cache, a prior notice indicating the arrival of a reply to the demand fetch request.

In the cache memory control method according to the present invention, the swap processing step issues, to the primary cache, a cancel of the prior notice when it has been determined, after the issuance of the prior notice during the swap determination period, that swap processing is not performed.

In the cache memory control method according to the present invention, the swap processing step performs the swap processing even when an error reply to the prefetch request has arrived during the swap determination period at which it is determined whether the swap processing is performed or not.

In the cache memory control method according to the present invention, when the error reply is delayed by the swap processing and thereby the error reply and a succeeding reply collide with each other, the swap processing step delays issuance of the succeeding reply.

In the cache memory control method according to the present invention, the swap processing step performs the swap processing even when the demand fetch request is a request that need not to be registered in a secondary cache.

According to a third aspect of the present invention, there is provided a central processing unit that performs control related to information processing comprising: a primary cache that issues a prefetch request and demand fetch request; a secondary cache that performs swap processing to allow a move-in buffer that has been ensured for replying the prefetch request to be used for a reply to the demand fetch request following the prefetch request; and a calculation section that performs calculation using data of the primary cache.

In the central processing unit according to the present invention, the secondary cache performs the swap processing by rewriting tag information of the move-in buffer.

In the central processing unit according to the present invention, when a correct reply to the prefetch request has arrived during a swap determination period at which it is determined whether the swap processing is performed or not, the secondary cache issues, to the primary cache, a prior notice indicating the arrival of a reply to the demand fetch request.

In the central processing unit according to the present invention, the secondary cache issues, to the primary cache, a cancel of the prior notice when it has been determined, after the issuance of the prior notice during the swap determination period, that swap processing is not performed.

In the central processing unit according to the present invention, the secondary cache performs the swap processing even when an error reply to the prefetch request has arrived during the swap determination period at which it is determined whether the swap processing is performed or not.

In the central processing unit according to the present invention, when the error reply is delayed by the swap processing and thereby the error reply and a succeeding reply collide with each other, the secondary cache delays issuance of the succeeding reply.

In the central processing unit according to the present invention, the secondary cache performs the swap processing even when the demand fetch request is a request that need not to be registered in the secondary cache.

According to a fourth aspect of the present invention, there is provided an information processor comprising: the one or more central processing units; a main storage section that stores data used by the central processing unit; and a main storage controller that manages data between the central processing unit and main storage section.

According to a fifth aspect of the present invention, there is provided a central processing method for performing control related to information processing comprising: a primary cache step of issuing a prefetch request and demanding fetch request; a secondary cache step of performing swap processing to allow a move-in buffer that has been ensured for replying the prefetch request to be used for a reply to the demand fetch request following the prefetch request; and a calculation step of performing calculation using data of the primary cache.

In the central processing method according to the present invention, the secondary cache step performs the swap processing by rewriting tag information of the move-in buffer.

In the central processing method according to the present invention, when a correct reply to the prefetch request has arrived during a swap determination period at which it is determined whether the swap processing is performed or not, the secondary cache step issues, to the primary cache step, a prior notice indicating the arrival of a reply to the demand fetch request.

In the central processing method according to the present invention, the secondary cache step issues, to the primary cache step, a cancel of the prior notice when it has been determined, after the issuance of the prior notice during the swap determination period, that swap processing is not performed.

In the central processing method according to the present invention, the secondary cache step performs the swap processing even when an error reply to the prefetch request has arrived during the swap determination period at which it is determined whether the swap processing is performed or not.

In the central processing method according to the present invention, when the error reply is delayed by the swap processing and thereby the error reply and a succeeding reply collide with each other, the secondary cache step delays issuance of the succeeding reply.

In the central processing method according to the present invention, the secondary cache step performs the swap processing even when the demand fetch request is a request that need not to be registered in the secondary cache step.

Note that the cache memory control unit corresponds to an L2 cache controller in the following embodiment; the request receiving section corresponds to MI-PORT and PF-PORT in the following embodiment; the swap processing section corresponds to a processing pipeline in the following embodiment; the central processing unit corresponds to a CPU in the following embodiment; the information processor corresponds to a multiprocessor system in the following embodiment; the main storage corresponds to a main memory in the following embodiment; and the main storage controller corresponds to an SC in the following embodiment.

According to the present invention, waiting time in a demand fetch processing for a prefetch processing to be completed is reduced, thereby increasing memory access speed in the information processor.

DETAILED DESCRIPTION OF THE PREFERRED EMBODIMENTS

An embodiment of the present invention will be described below with reference to the accompanying drawings.

The present invention enables the MIB that has been ensured when a cache miss of a preceding prefetch request has occurred to be used for a succeeding demand fetch request. This processing is referred to as MIB swap processing. More specifically, the MIB holds, as tag information, types of the requests that are issued from the L1 cache, the requests being factors by which the MIB itself is ensured. The above swap processing is realized by rewriting the tag information from the prefetch request to demand fetch request.

Figure 1:
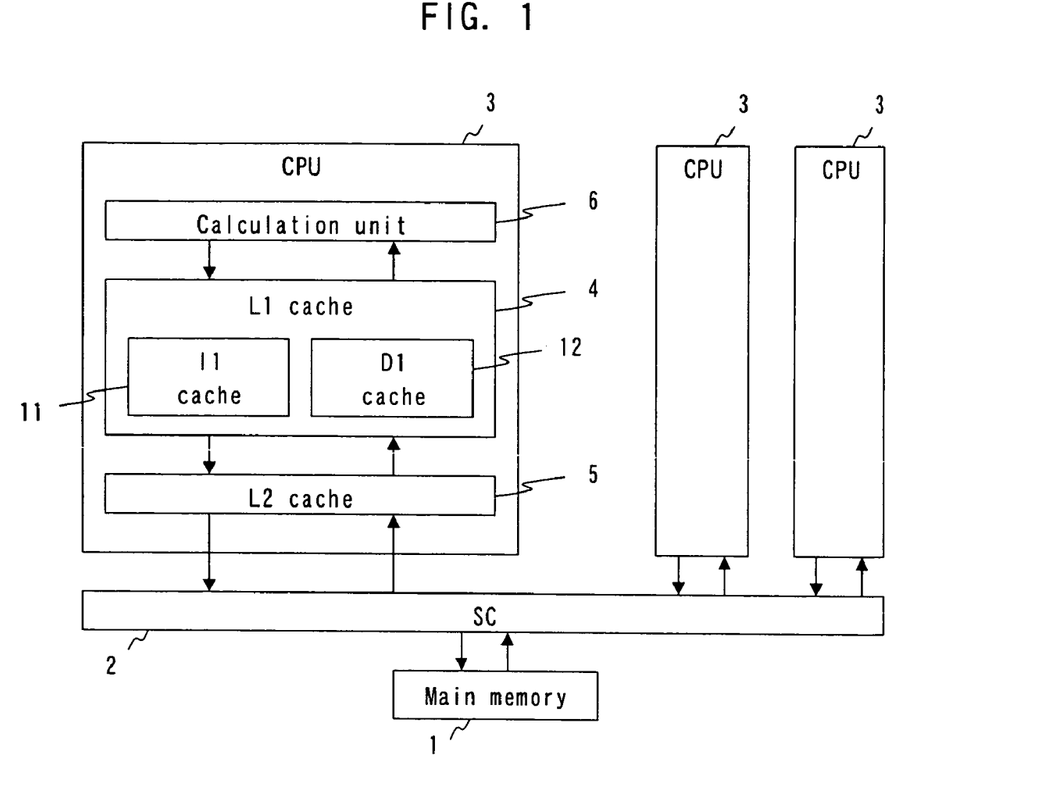
FIG. 1 is a block diagram showing a configuration example of a multiprocessor system according to the present invention.

FIG. 1 is a block diagram showing a configuration example of a multiprocessor system according to the present invention. In FIG. 1, the same reference numerals as those in FIG. 6 denote the same or corresponding parts as those in FIG. 6, and the descriptions thereof will be omitted here. The multiprocessor system of FIG. 1 includes a CPU 3 and an L2 cache 5 in place of the CPU 103 and L2 cache 105, respectively.

Figure 2:
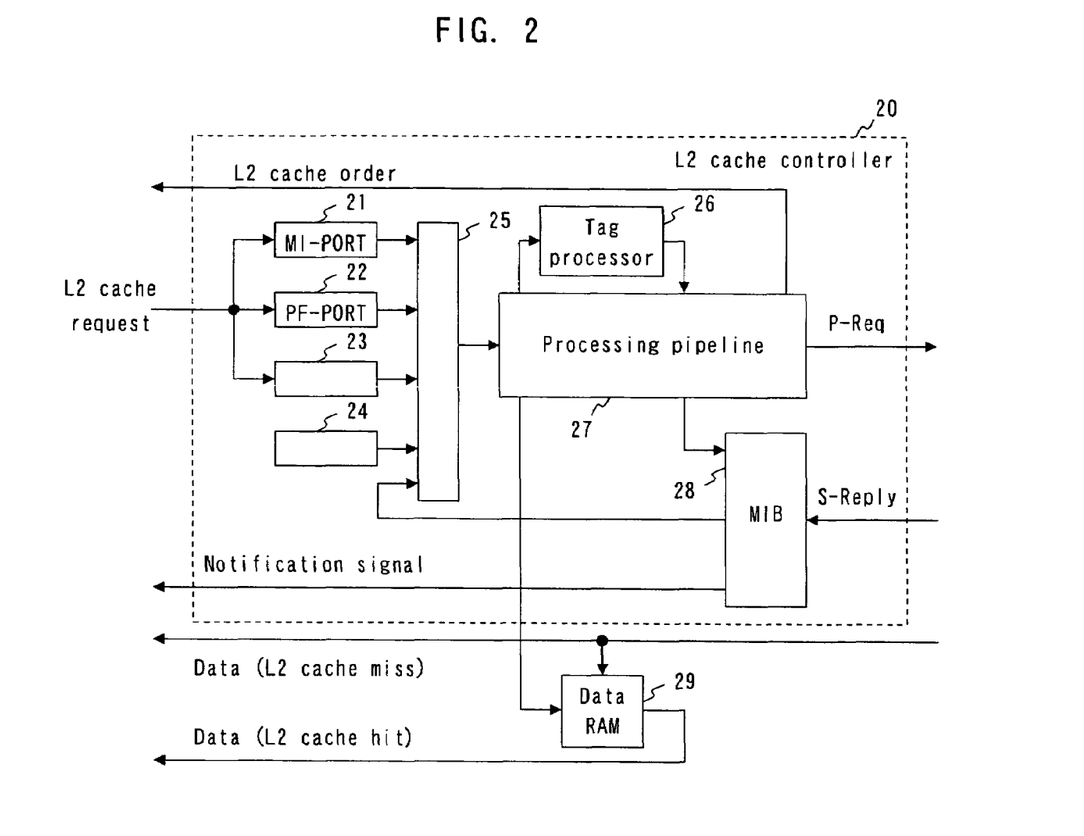
FIG. 2 is a block diagram showing a configuration example of an L2 cache according to the present invention.

FIG. 2 is a block diagram showing a configuration example of an L2 cache according to the present invention. In FIG. 2, the same reference numerals as those in FIG. 8 denote the same or corresponding parts as those in FIG. 8, and the descriptions thereof will be omitted here. The L2 cache of FIG. 2 includes an L2 cache controller 20, a processing pipeline 27, and an MIB 28 in place of the L2 cache controller 120, processing pipeline 127, and MIB 128, respectively.

Figure 3:
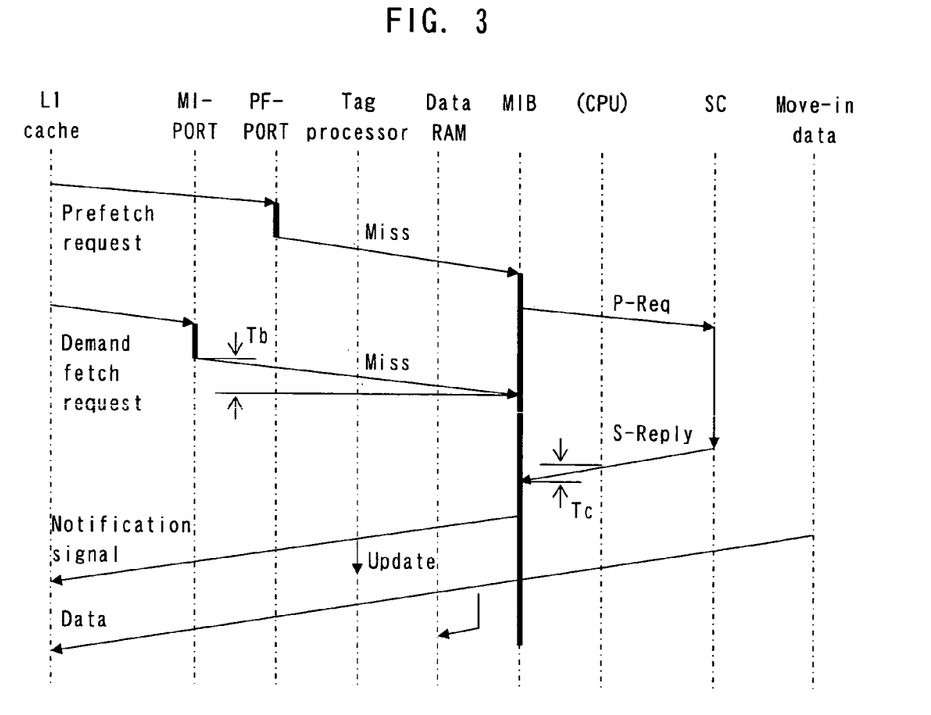
FIG. 3 is a time chart showing an operation of the L2 cache in the case where swap processing according to the present invention is performed.

FIG. 3 is a time chart showing an operation of the L2 cache in the case where swap processing according to the present invention is performed. Firstly, a preceding prefetch request is fed from the PF-PORT 22 to the processing pipeline 27. Then a cache miss of the preceding prefetch request has occurred. In this case, the MIB 28 is ensured and P-Req is issued. Next, a succeeding demand fetch request for the same address is fed from the MI-PORT 21 to the processing pipeline 27. Then a cache miss also occurs in this case. Here, the swap processing is performed such that the MIB 28 corresponding to the same address is apparently ensured by the demand fetch request. The reply data that has been sent from the SC 2 in response to the preceding prefetch request is then used by the succeeding demand fetch request. As a result, it is possible to immediately send data to the L1 cache 4.

Figure 4:
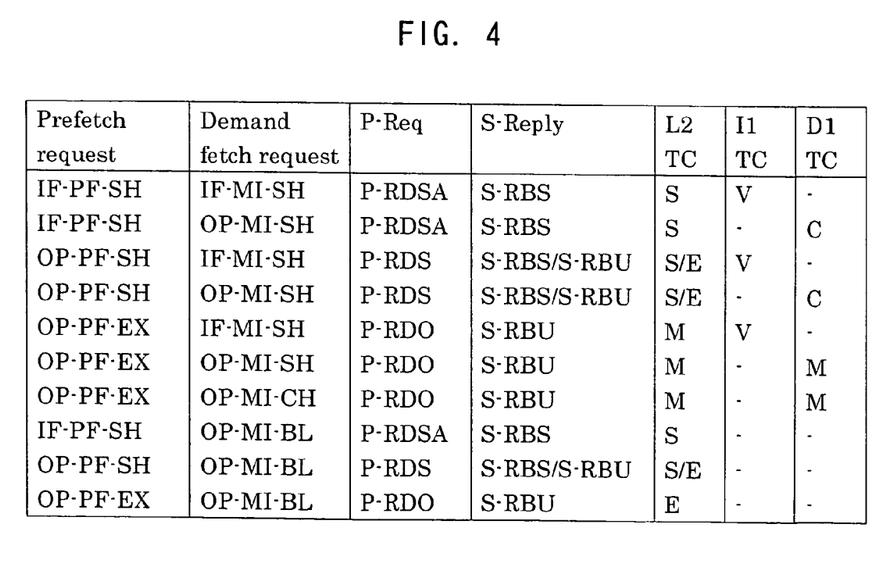
FIG. 4 is a table showing an example of combinations between prefetch and demand fetch that allows the swap processing according to the present invention to be performed.

The above swap processing can be performed only in the case of the combination of requests that allows the processing performed when the MIB 28 is ensured due to a cache miss of the prefetch request to be taken over by the succeeding demand fetch request. FIG. 4 is a table showing an example of combinations between prefetch and demand fetch that allows the swap processing according to the present invention to be performed.

Here, even when a block load OP-MI-BL is performed for the same address as the prefetch request, it is possible to complete the swap processing. In this case, in order to maintain compatibility (processing for the cache block to be replaced) with the preceding prefetch request, data registration in the L2 cache 5, which is not made in the normal block load, is performed.

In the case where the MIB 28 that has been ensured by the prefetch request receives a reply cache block data from the SC 2 and starts to perform the data registration in the L2 cache 5, this MIB 28 is not allowed to become a target of the swap processing. The reason is that since data is not sent to the L1 cache 4 in the case of the prefetch request, it is impossible to immediately send the received cache block to the L1 cache 4 even if swap processing has been performed.

Here, a description will be given of combinations of requests other than those shown in the table of FIG. 4, that is, the combination that the swap processing cannot be applied to.

Firstly, in the case where a preceding prefetch request is IF-PF-SH or OP-PF-SH, and a succeeding demand prefetch request is OP-MI-CH, swap processing cannot be performed. The reason is that, an L2 cache registration assumes S type in the preceding prefetch in some cases as shown in FIG. 7, whereas an L2 cache registration always assumes E type in the succeeding demand fetch, so that consistency between caches cannot be maintained.

Further, in the case where a succeeding demand fetch is IF-MI-SH, the swap processing cannot be performed. The reason is that although an L2 cache registration always assumes S type since P-Req that is issued at the time of a cache miss of IF-MI-SH is P-RDSA as shown in FIG. 7, there is a possibility that an L2 cache registration assumes E type or M type depending on the type of P-Req that has been issued due to a cache miss of a preceding prefetch request, so that consistency between caches cannot be maintained.

Further, in the case where the succeeding demand fetch is OP-MI-SH, the swap processing cannot be performed. The reason is that although an L2 cache registration of OP-MI-SH assumes S type or E type as shown in FIG. 7, an L2 cache registration assumes M type when the preceding prefetch request is OP-PF-EX, so that consistency between caches cannot be maintained.

Figure 5:
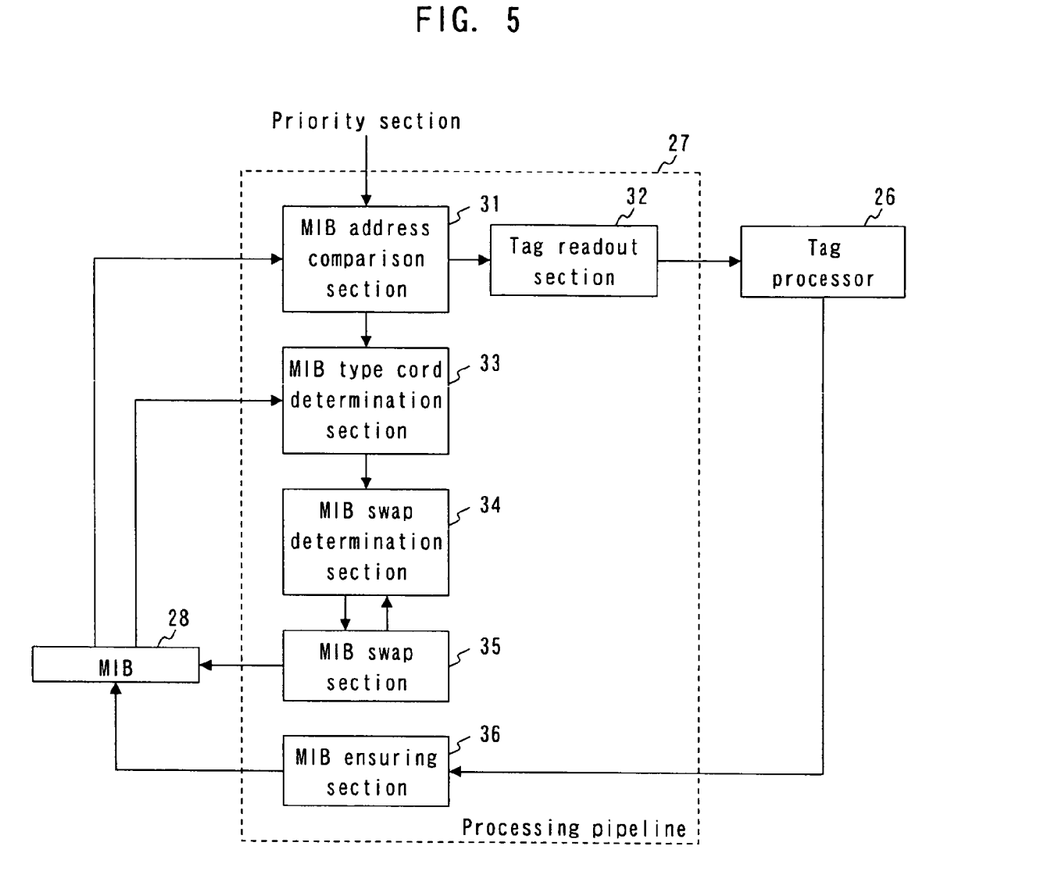
FIG. 5 is a block diagram showing a configuration example of a processing pipeline according to the present invention.

FIG. 5 is a block diagram showing a configuration example of a processing pipeline according to the present invention. The processing pipeline 27 includes an MIB address comparison section 31, a tag readout section 32, an MIB type cord determination section 33, an MIB swap determination section 34, an MIB swap section 35, and an MIB ensuring section 36.

A request from the MI-PORT 21 or PF-PORT 22 is fed to the processing pipeline 27 as a read flow through the priority section 25. The MIB address comparison section 31 compares target addresses of a preceding request and succeeding request.

The tag readout section 32 sends a tag to the tag processor 26, and the tag processor 26 then conducts a search. In the case of a cache hit, data is fed back to the L1 cache 4 (data is not fed back in the case of prefetch). In the case where a cache miss occurs, the MIB ensuring section 36 ensures the MIB 28 and issues a move-in request to the SC 2. A read flow for a demand fetch request is referred to as demand_read.

Then a possibility of swap processing is detected for each MIB. The MIB type cord determination section 33 determines whether a combination of the successive L2 cache requests is one of the combinations shown in FIG. 4 that allows the swap processing to be performed. When determining that the combination is one of the combinations that allow the swap processing to be performed, the MIB type cord determination section 33 sends the determination result as "swap possibility" to the MIB swap determination section 34.

The MIB swap determination section 34 determines that the swap conditions are met based on "swap possibility" from the MIB type cord determination section 33 and demand_read of the processing pipeline 27 and the MIB swap section 35 then rewrites tag information of the MIB 28.

The tag information that the MIB 28 holds includes "xreply", "address", "pf", "opc", and "swapped". "xreply" indicates that the MIB 28 has received a reply from the SC 2; "address" indicates a request move-in address; "pf" indicates that the MIB has been ensured by prefetch; "opc" indicates a type of the request that has caused the MIB 28 to be ensured; "swapped" indicates that the swap processing has been performed such that the factor that has ensured the MIB 28 is switched from prefetch to demand fetch.

In FIG. 3, Tb is a time period from the time at which the read flow performing swap processing has been fed to the processing pipeline 27 to the time before the swap processing has been started. This Tb is referred to as swap determination period. An update request to the MIB 28 is issued four cycles after the read flow has been fed to the processing pipeline 27. A processing flow is assumed to be fed to the processing pipeline 27 every two cycle.

The read flow itself may be disrupted due to detection of a correctable error or the like. In this case, swap processing cannot be realized and the tag information of the MIB 28 is not updated accordingly.

When two demand_read having "swap possibility" are sequentially fed to the processing pipeline 27, "swap possibility" may be detected two times. To avoid this, when a preceding processing flow that has been issued two cycles before is processing for the same address and performs update of the tag information of the MIB 28, the swap processing of a succeeding processing flow is prevented.

In FIG. 3, Tc is a time period from the time at which the CPU 3 has received a reply from the SC 2 to the time at which the tag information "xreply" indicating that the MIB 28, which is a request source, has received the reply has been set In the case where time periods Tc and Tb are overlapped, that is, when the demand_read having "swap possibility" is newly fed to the processing pipeline 27 for the same MIB, the arrived move-in data is immediately transferred to the L1 cache 4 after completion of swap processing. If the swap processing has not been performed, which means prefetch processing, notification to the L1 cache 4 is not issued.

To realize this, when move-in data has arrived while the read flow having "swap possibility" flows in the processing pipeline 27, a prior notice indicating arrival of the move-in data is given to the L1 cache 4 and a cancel signal is issued to the L1 cache 4 if swap processing has not been performed afterward.

In the L2 cache 5 according to the present invention generates, the MIB 28 generates a data valid signal (DOW-fr-SC) and a cancel signal (DOW-CAN-fr-SC) thereof in order to notify the L1 cache 4 of the arrived move-in data. DOW-fr-SC indicates that a request move-in data has arrived in the L2 cache 5 from the SC 2. DOW-CAN-fr-SC indicates that DOW-fr-SC that had been issued several cycles before (here, three cycles before) has become invalid. The MIB 28 as a request source that should receives a move-in data at the time when the L2 cache 5 has received the move-in data from the SC 2 is referred to as current MIB.

In the prior art, when a move-in data, which originates not in a prefetch request but in a demand fetch request, arrives, DOW-fr-SC has been used as a valid signal. On the other hand, in the present invention, when the current MIB has "swap possibility", issuance of DOW-fr-SC is permitted. Then, at three cycles after the time when the issuance of DOW-fr-SC has been permitted due to "swap possibility", swapped tag information of the current MIB is referred to. If the swap processing has not been performed, which means prefetch processing, DOW-CAN-fr-SC is issued and the previously issued DOW-fr-SC is canceled.

In the case where an error reply has arrived from the SC 2 during the swap determination period, an error notification is issued to the L1 cache 4 when the swap processing has been completed and the request has been handled as demand fetch processing, whereas an error notification is not issued to the L1 cache 4 when the swap processing is not effected and the request has been handled as prefetch processing.

To realize the above processing, the MIB 28 of the L2 cache 5 according to the present invention generates an error notification signal and issues the signal to the L1 cache 4.

In the prior art, an error notification to the L1 cache is not performed with respect to an error reply that the MIB ensured by a prefetch request has been received. However, in the present invention, an error notification must be performed in the case where swap processing has been made. Thus, when the MIB 28 that has been ensured by a prefetch request has received an error reply, it refers to tag information "swapped" thereof three cycles after the reception of the error reply. When determining that swap processing has been performed, the MIB 28 performs notification to the L1 cache 4. The time corresponding to the above three cycles is the time required to set a determination result in the tag information of the MIB 28 when the MIB 28 that has received an error reply from the SC 2 (at this time point, tag information "xreply" has not been set and the MIB 28 may become a target of swap processing) is a target of swap determination in the processing pipeline 27.

As described above, when swap processing has been applied to the MIB 28 that had received an error reply, an error notification signal is issued behind a normal error notification signal. When the error notification signal that has issued behind and the succeeding normal error signal collide with each other, issuance of the succeeding error notification signal is delayed.

What is claimed is:

1. A cache memory control unit that controls a cache memory comprising:
   a request receiving section that receives a prefetch request and a demand fetch request issued from a primary cache; and
   a swap processing section that performs swap processing when the request receiving section receives a demand fetch request designating a memory address as that designated by a prefetch request already received by the request receiving section, so that a move-in buffer (MIB), which is ensured due to a cache miss of the prefetch request received for replying to the prefetch request, is used for a reply to the demand fetch request received subsequent to the prefetch request;
   wherein the swap processing section comprises:
      an MIB ensuring section that ensures the move-in buffer;
      an MIB swap determination section that determines whether the swap processing is to be performed or not; and
      an MIB swap section that rewrites tag information of the move-in buffer when the MIB swap determination section makes a determination that the swap processing is to be performed;
   wherein when a correct reply to the prefetch request has arrived during a swap determination period in which it is determined by the MIB swap determination section whether the swap processing is to be performed or not, the swap processing section issues, to the primary cache, prior notice indicating an arrival of a reply to the demand fetch request and sends the correct reply to the primary cache; and the swap determination period is a time period from a time at which the demand fetch request has been received by the request receiving section to a time before the swap processing has been started by the MIB swap section.

2. The cache memory control unit according to claim 1, wherein the swap processing section issues, to the primary cache, a cancel of the prior notice when it has been determined, after the issuance of the prior notice during the swap determination period, that swap processing is not performed.

3. The cache memory control unit according to claim 1, wherein the swap processing section performs the swap processing even when an error reply to the prefetch request has arrived during the swap determination period at which it is determined whether the swap processing is performed or not.

4. The cache memory control unit according to claim 3, wherein, when the error reply is delayed by the swap processing and thereby the error reply and a succeeding reply collide with each other, the swap processing section delays issuance of the succeeding reply.

5. The cache memory control unit according to claim 1, wherein the swap processing is performed even when the demand fetch request is a request that need not to be registered in a secondary cache.

6. A cache memory control method for controlling a cache memory comprising:

receiving a prefetch request and a demand fetch request issued from a primary cache; and performing swap processing when receiving a demand fetch request designating a memory address as that designated by a prefetch request already received, wherein the swap processing is performed when a move-in buffer is ensured due to a cache miss of the prefetch request received so that the move-in buffer for replying to the prefetch request is used for a reply to the demand fetch request received subsequent to the prefetch request;

the swap processing is performed by rewriting tag information of the move-in buffer;

when a correct reply to the prefetch request has arrived during a swap determination period in which it is determined whether the swap processing is performed or not, a prior notice indicating an arrival of a reply to the demand fetch request is issued to the primary cache while and sends the correct reply to the primary cache; and the swap determination period is a time period from a time at which the demand fetch request has been received to a time before the swap processing has been started.

7. The cache memory control method according to claim 6, wherein the swap processing includes issuing, to the primary cache, a cancel of the prior notice when it has been determined, after the issuance of the prior notice during the swap determination period, that swap processing is not performed.

8. The cache memory control method according to claim 6, wherein the swap processing is performed even when an error reply to the prefetch request has arrived during the swap determination period at which it is determined whether the swap processing is performed or not.

9. The cache memory control method according to claim 8, wherein, when the error reply is delayed by the swap processing and thereby the error reply and a succeeding reply collide with each other, the swap processing delays issuance of the succeeding reply.

10. The cache memory control method according to claim 6, wherein the swap processing is performed even when the demand fetch request is a request that need not to be registered in a secondary cache.

11. A central processing unit that performs control related to information processing comprising:

a primary cache that issues a prefetch request and a demand fetch request;

a secondary cache that performs swap processing when a move-in buffer (MIB) is ensured due to a cache miss of the prefetch request so that the move-in buffer for replying to the prefetch request is used for a reply to the demand fetch request received subsequent to the prefetch request; and a calculation section that performs calculation using data of the primary cache;

wherein the secondary cache comprises:

an MIB ensuring section that ensures the move-in buffer;

an MIB swap determination section that determines whether the swap processing is to be performed or not; and an MIB swap section that rewrites tag information of the move-in buffer when the MIB swap determination section makes a determination that the swap processing is to be performed;

wherein when a correct reply to the prefetch request has arrived during a swap determination period in which it is determined by MIB swap determination section whether the swap processing is to be performed or not, the secondary cache issues, to the primary cache, a prior notice indicating an arrival of a reply to the demand fetch request and sends the correct reply to the primary cache; and the swap determination period is a time period from a time at which the demand fetch request has been received to a time before the swap processing has been started by the MIB swap section.

12. The central processing unit according to claim 11, wherein the secondary cache issues, to the primary cache, a cancel of the prior notice when it has been determined, after the issuance of the prior notice during the swap determination period, that swap processing is not performed.

13. The central processing unit according to claim 11, wherein the secondary cache performs the swap processing even when an error reply to the prefetch request has arrived during the swap determination period at which it is determined whether the swap processing is performed or not.

14. The central processing unit according to claim 13, wherein, when the error reply is delayed by the swap processing and thereby the error reply and a succeeding reply collide with each other, the secondary cache delays issuance of the succeeding reply.

15. The central processing unit according to claim 11, wherein the secondary cache performs the swap processing even when the demand fetch request is a request that need not to be registered in the secondary cache.

16. An information processor comprising:

a central processing unit as claimed in claim 11;

a main storage section that stores data used by the central processing unit; and a main storage controller that manages data between the central processing unit and main storage section.

17. A central processing method for performing control related to information processing comprising;

issuing via a primary cache a prefetch request and a demand fetch request;

performing swap processing via a secondary cache when a move-in buffer is ensured due to a cache miss of the prefetch request so that the move-in buffer for replying to the prefetch request is used for a reply to the demand fetch request received subsequent to the prefetch request; and performing calculation using data of the primary cache;

wherein the secondary cache performs the swap processing by rewriting tag information of the move-in buffer;

when a correct reply to the prefetch request has arrived during a swap determination period in which it is determined whether the swap processing is performed or not, the secondary cache issues, to the primary cache, a prior notice indicating an arrival of a reply to the demand fetch request and sends the correct reply to the primary cache; and the swap determination period is a time period from a time at which the demand fetch request has been received to a time before the swap processing has been started.

18. The central processing method according to claim 17, wherein the secondary cache issues, to the primary cache, a cancel of the prior notice when it has been determined, after the issuance of the prior notice during the swap determination period, that swap processing is not performed.

19. The central processing method according to claim 17, wherein the secondary cache performs the swap processing even when an error reply to the prefetch request has arrived during the swap determination period at which it is determined whether the swap processing is performed or not.

20. The central processing method according to claim 19, wherein, when the error reply is delayed by the swap processing and thereby the error reply and a succeeding reply collide with each other, the secondary cache delays issuance of the succeeding reply.

21. The central processing method according to claim 17, wherein the secondary cache performs the swap processing even when the demand fetch request is a request that need not to be registered in the secondary cache.

22. A method of performing control related to information processing, comprising:

issuing via a primary cache a prefetch request and a demand fetch request;

performing swap processing via a secondary cache by rewriting tag information of a move-in buffer resulting from a cache miss of a prefetch request issued from the primary cache; and using the tag information subsequent to said rewriting in association with the secondary cache responsive to receipt of a fetch request designating a memory address as that of the prefetch request, regardless of whether the fetch request needs to be registered to the secondary cache;

wherein when a correct reply to the prefetch request has arrived during a swap determination period in which it is determined whether the swap processing is performed or not, a prior notice indicating an arrival of a reply to the demand fetch request is issued to the primary cache and sends the correct reply to the primary cache; and the swap determination period is a time period from a time at which the demand fetch request has been received to a time before the swap processing has been started.

\* \* \* \* \*